Oct. 6, 1931.           W. E. SPLAIN           1,825,682
              LIQUID DISPENSING APPARATUS
                   Filed Sept. 18, 1928
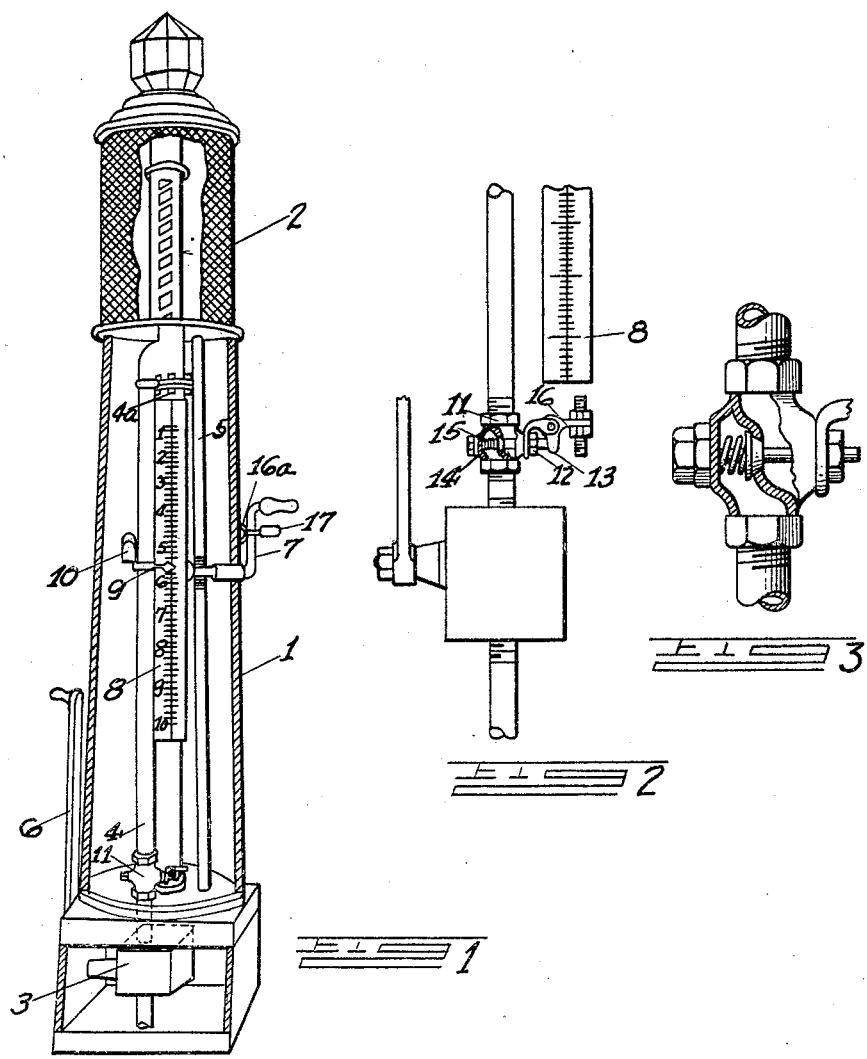
INVENTOR.
Walter E Splain
BY
Allen & Allen
ATTORNEYS Patented Oct. 6, 1931

1,825,682

UNITED STATES PATENT OFFICE

WALTER E. SPLAIN, OF TERRACE PARK, OHIO, ASSIGNOR TO WILLIAM B. GRISCHY, OF CINCINNATI, OHIO

LIQUID DISPENSING APPARATUS

Application filed September 18, 1928. Serial No. 306,632.

My invention relates to liquid dispensing apparatus and to counting mechanism associated therewith, and particularly to means for preventing the operation of the dispensing apparatus cooperatively connected with the counting mechanism, so that the dispensing apparatus can not operate and liquid be dispensed excepting at such times as the counting mechanism will record the amount of liquid dispensed.

It is the object of my invention to provide, in a liquid dispensing apparatus, for a positive seal on the input line to the dispensing apparatus, which will be opened only by physical contact with means operatively connected with the counting mechanism at the end of a counting operation so that it will be essential that the counting and discharging mechanism be moved through its regular cycle of operation.

In one particular type of dispensing apparatus, in combination with which my present invention is adaptable, there is a glass cylinder mounted on standards. The cylinder acts as the reservoir for the fluid to be dispensed. Within the cylinder there is a fixed fill pipe and within this fixed fill pipe there is a sliding open topped pipe acting as a sleeve with relation to the fixed pipe. This fixed pipe has a longitudinal port which is continuously exposed by downward movement of the sleeve. The top of the sliding tube determines the level of the liquid which will flow out, and in order to fill the cylinder, the sliding tube must be moved so that a port in it will register with an input pipe. In this type of dispensing apparatus, a scale mounted in cooperating relation to the sliding pipe provides a visible gauge of the quantity of fluid dispensed. Connected to this gauge is a recording counter which registers the amount of liquid dispensed.

In this assembly for which my invention is particularly designed, instead of recording the amount of fuel which is pumped into the cylinder, I record the amount of liquid which is pumped out of the cylinder. This allows the operator of the pump to return any undispensed fuel into his storage tank at night, without affecting the accounting system by which he is charged with the amount of fuel dispensed and credited with the cash which he has received.

The accuracy of such a system as is provided in such a combination is limited to the possibility of insuring that prior to setting the sliding fill pipe within the fixed fill pipe in the filling position, that movement of the sliding pipe to its fully discharged position be enforced. Reference is hereby made to United States Patent #1,653,231 in which an assembly operable accordingly is disclosed. In case the operator fails to move the sliding pipe to the extreme limit of its movement, the input port and the output port may be in partial registry, and the operator of the pump can cheat the oil company, by pumping through the partially registered ports of the input and output pipes, and so dispense gasoline without its being recorded on the recording device or counting mechanism.

I accomplish an enforced movement of the sliding pipe to fully extended position by providing means which will block the input pipe after each successive dispensing operation until the operator has fully elevated his sliding pipe.

Referring to the drawings in which I have illustrated dispensing apparatus with which my invention is incorporated:—

Figure 1 is a perspective view of a dispensing apparatus illustrating my invention, with portions of the casing cut away to reveal the inner structure.

Figure 2 is a side elevation of the valve for blocking the fill pipe shown as drawn to an enlarged scale.

Figure 3 is a part side view and part section of the whistle valve.

The assembly is made up as follows: The casing indicated at 1 encloses the dispensing equipment and supports the dispensing cylinder indicated at 2. The pump for filling the cylinder is indicated at 3, and the discharge line from the pump into the cylinder is shown at 4. The discharge pipe 4a from the cylinder to the customer's tank is indicated as is also the return pipe 5 to the underground storage tank. A handle 6 is shown for operating the pump, although the type of pump or the means provided for filling the dispensing cylinder forms no part of my invention. For regulating the movement of the sliding tube, a handle 7 is indicated, which elevates and lowers the sliding tube, and at the same time lowers and elevates the gauge 8, which moves in an opposite direction and provides a visible indication of the quantity dispensed by relative movement with relation to a fixed pointer indicated at 9. This lowering or raising of the gauge 8 and sliding tube is effected by any suitable gearing (not shown). If a rack bar and pinion as indicated in Patent No. 1,653,231 is used to move the sliding tube then a similar rack bar mounted on the gauge 8 and adapted to mesh with the actuating pinion on the side thereof opposite to the tube rack bar will accomplish the result. Obviously, however, any desirable arrangement of gearing may be utilized. The counting mechanism indicated at 10 is also operatively connected with the gears or other suitable mechanism with which the handle 7 actuates the sliding tube and the gauge, and acts to record the total amount of fluid dispensed from the pump. Any suitable connection from the counting mechanism to the handle 7, or for that matter to the sliding tube or to the gauge will be satisfactory, it being merely necessary that the recorder 10 maintain record of the gasoline dispensed in accordance with the operation of the gauge 8 which is designed to indicate an individual quantity dispensed to one customer. The counter may be provided with a suitable ratchet and pawl mechanism, or the like to prevent retrograde movement.

In the discharge pipe 4 from the pump into the cylinder, I have mounted a whistle valve indicated at 11, which has a packed gland 12 on a stem 13, which extends from the valve casing and is adapted with inward pressure to unseat the valve seat 14, which is normally held in closed position by a spring 15. A bell crank 16 is mounted so as to press inwardly on the stem 13 during intervals of downward depression by means of the gauge board 8. Until the gauge board is sufficiently depressed to bear against the bell crank, any pressure of liquid in the discharge pipe from the pump to the cylinder, will act to more firmly seat the valve disc of the whistle valve in pipe blocking position.

Thus, positive means is provided which insures operation of the counting mechanism, i. e., a connection to the manual control by means of which fluid is dispensed and the valve 11 which prevents fluid being pumped into the dispensing cylinder during removal of the fluid therefrom, and thus prevents the possibility of dispensing without the amount dispensed being accurately recorded.

As the handle 7, which controls the quantity of liquid dispensed, is conveniently located for manual operation, I provide a hasp 16a and padlock 17 for locking the dispensing equipment. This lock provides means for locking the filling equipment, which is connected and operates on the dispensing portion of the apparatus. Thus, indirectly, I can lock the filling mechanism by means of a lock for the dispensing mechanism. By locating the hasp with proper relation to the handle, it will be impossible to lock the handle in any other position than with the valve 11 closed.

There are a wide range of mechanical equivalent structures which will readily occur to those skilled in the art, by which mechanism with similar functions may be assembled. I consider the essential novel feature of my invention the provision of positive line blocking means, which will prevent the passage of fuel into the dispensing cylinder, except when the operation of the dispensing apparatus is carried out in its regular sequence of operations. I further consider my locking control an important improvement.

While the use of a valve in the fill pipe which is opened by some part of the counting apparatus at the limit of its counting operation, will be of much value to insure the registry of two ports, the invention is also applicable to a dispensing apparatus in which the fixed fill pipe and the sliding dispensing pipe are entirely disassociated.

In such a combination the utility of the whistle valve or valve normally closed in the fixed fill pipe is to insure that no liquid can be pumped into the tank while liquid is being dispensed. The valve in this case, will be so connected with the recording mechanism that it will only be opened when the sliding tube is at the upper limit of its movement. Thus the operator cannot pump with the tank and dispense at the same time.

Having thus described my invention, what I claim as new and desire to secure by Letters Patent, is:—

1. A fluid dispensing assembly comprising a gravity dispensing reservoir, means for filling said reservoir, a pipe through which said filling means may fill said reservoir, a movable member controlling the quantity dispensed from said reservoir, said member operatively connected with means for registering the movement thereof, means for blocking the passage of fluid through said first mentioned pipe, and means operatively connected with said movable member for opening said fluid blocking means at a predetermined position of movement of said movable member.

2. A fluid dispensing assembly comprising a gravity dispensing reservoir, means for filling said reservoir, a pipe through which said filling means may fill said reservoir, a movable member controlling the quantity dispensed from said reservoir, said member operatively connected with means for registering the movement thereof, means for blocking the passage of fluid through said first mentioned pipe, and means operatively connected with said movable member for opening said fluid blocking means at a predetermined position of movement of said movable member, said fluid blocking means comprising a valve having a normally closed position.

3. A fluid dispensing assembly comprising a gravity dispensing reservoir, means for filling said reservoir, a pipe through which said filling means may fill said reservoir, a movable member controlling the quantity dispensed from said reservoir, said member operatively connected with means for registering the movement thereof, means for blocking the passage of fluid through said first mentioned pipe, and means operatively connected with said movable member for opening said fluid blocking means at a predetermined position of movement of said movable member, said fluid blocking means comprising a valve having a normally closed position, and means carrying a visible gauge operatively connected therewith for opening the normally closed valve.

4. A fluid dispensing assembly comprising a gravity dispensing reservoir, means for filling said reservoir, a pipe through which said reservoir is filled, a movable member controlling the quantity dispensed from said reservoir, manual means for actuating said movable member, positive means operatively connected with said manual means for blocking said pipe, and means for locking said manual means with the pipe blocking means in operative position.

WALTER E. SPLAIN.